United States Patent
Teranishi et al.

(10) Patent No.: US 11,020,707 B2
(45) Date of Patent: Jun. 1, 2021

(54) MONOLITHIC SEPARATION MEMBRANE STRUCTURE, METHOD FOR PRODUCING MONOLITHIC SEPARATION MEMBRANE STRUCTURE, AND METHOD FOR DEHYDRATING

(71) Applicant: NGK INSULATORS, LTD., Nagoya (JP)

(72) Inventors: Makoto Teranishi, Nagoya (JP); Akimasa Ichikawa, Nagoya (JP); Hideyuki Suzuki, Nagoya (JP)

(73) Assignee: NGK Insulators, Ltd., Nagoya (JP)

( * ) Notice: Subject to any disclaimer, the term of this patent is extended or adjusted under 35 U.S.C. 154(b) by 872 days.

(21) Appl. No.: 15/263,664

(22) Filed: Sep. 13, 2016

(65) Prior Publication Data

US 2016/0375406 A1    Dec. 29, 2016

Related U.S. Application Data

(63) Continuation of application No. PCT/JP2015/055936, filed on Feb. 27, 2015.

(30) Foreign Application Priority Data

Mar. 28, 2014   (JP) .............................. JP2014-068606

(51) Int. Cl.
*B01D 63/06*         (2006.01)
*B01D 69/12*         (2006.01)
(Continued)

(52) U.S. Cl.
CPC ......... *B01D 63/066* (2013.01); *B01D 46/247* (2013.01); *B01D 46/2429* (2013.01);
(Continued)

(58) Field of Classification Search
None
See application file for complete search history.

(56) References Cited

U.S. PATENT DOCUMENTS 5,185,110 A *   2/1993   Hamaguchi ........ B01D 39/2075
                                                   264/177.12
6,214,227 B1    4/2001   Park et al.
(Continued)

FOREIGN PATENT DOCUMENTS

CN    101534929 A    9/2009
CN    102427872 A    4/2012
(Continued)

OTHER PUBLICATIONS

European Office Action (Application No. 15769570.1) dated Oct. 17, 2018.
(Continued)

*Primary Examiner* — Krishnan S Menon
*Assistant Examiner* — Brad Gordon
(74) *Attorney, Agent, or Firm* — Burr & Brown, PLLC

(57) ABSTRACT

A monolithic separation membrane structure comprises a support body and a separation membrane. The support body is composed of a porous material and includes a plurality of through holes. The separation membrane is formed in a tubular shape on an inner side of the plurality of through holes, and is used in a penetrative vaporization method or a vapor infiltration method. The helium gas permeation resistance in the support body is less than $8.3 \times 10^7$ Pa·sec/m².

1 Claim, 2 Drawing Sheets

(51) Int. Cl.
   *B01D 53/22*   (2006.01)
   *B01D 67/00*   (2006.01)
   *B01D 46/24*   (2006.01)
   *B01D 71/02*   (2006.01)
   *B01D 61/36*   (2006.01)

(52) U.S. Cl.
   CPC ......... *B01D 53/228* (2013.01); *B01D 61/362* (2013.01); *B01D 67/0046* (2013.01); *B01D 69/12* (2013.01); *B01D 63/061* (2013.01); *B01D 71/021* (2013.01); *B01D 71/024* (2013.01); *B01D 2325/20* (2013.01)

(56) References Cited

U.S. PATENT DOCUMENTS

| | | | |
|---|---|---|---|
| 2003/0175496 A1* | 9/2003 | Bishop | B01D 39/2068 428/312.8 |
| 2006/0090651 A1 | 5/2006 | Liu et al. | |
| 2007/0138083 A1 | 6/2007 | Aizawa | |
| 2007/0189936 A1* | 8/2007 | Suwabe | B01D 53/9431 422/177 |
| 2008/0152865 A1* | 6/2008 | Takeno | B01D 63/066 428/134 |
| 2009/0206025 A1 | 8/2009 | Ichikawa et al. | |
| 2009/0247396 A1* | 10/2009 | Mizutani | B01D 53/944 502/100 |
| 2011/0253619 A1 | 10/2011 | Aizawa | |
| 2012/0009092 A1* | 1/2012 | Mizutani | B01J 23/002 422/177 |
| 2012/0074061 A1* | 3/2012 | Teranishi | B01D 61/362 210/640 |
| 2013/0001156 A1 | 1/2013 | Takeno | |
| 2013/0126420 A1 | 5/2013 | Teranishi et al. | |

FOREIGN PATENT DOCUMENTS

| | | | |
|---|---|---|---|
| CN | 102985171 A | 3/2013 | |
| EP | 0 899 003 A1 | 3/1999 | |
| JP | 2004-223416 A1 | 8/2004 | |
| JP | 2006-231123 A1 | 9/2006 | |
| JP | 3868479 B2 | 1/2007 | |
| WO | 2005/087356 A1 | 9/2005 | |
| WO | 2010/134514 A1 | 11/2010 | |
| WO | WO-2010134514 A1 * | 11/2010 | ........ B01D 61/362 |
| WO | 2011/122059 A1 | 10/2011 | |

OTHER PUBLICATIONS

English translation of International Preliminary Report on Patentability (Chapter I) (Application No. PCT/JP2015/055936) dated Oct. 13, 2016.
Extended European Search Report (Application No. 15769570.0) dated Oct. 5, 2017.
International Search Report and Written Opinion (Application No. PCT/JP2015/055936) dated Jun. 2, 2015.
Chinese Office Action (Application No. 201580009163.9) dated Jun. 28, 2018 (with English translation).
European Summons to Attend Oral Proceedings, European Application No. 15769570.1, dated Jun. 16, 2020 (9 pages).
Ohji, T., et al. "Macro-porous ceramics: processing and properties," *International Materials Reviews*, dated Nov. 12, 2013 (18 pages).

* cited by examiner

MONOLITHIC SEPARATION MEMBRANE STRUCTURE, METHOD FOR PRODUCING MONOLITHIC SEPARATION MEMBRANE STRUCTURE, AND METHOD FOR DEHYDRATING

TECHNICAL FIELD

The present invention relates to a monolithic separation membrane structure used in a method of penetrative vaporization or a method of vapor infiltration, and to a method of producing the monolithic separation membrane structure, and a method of dehydrating.

BACKGROUND ART

A monolithic separation membrane structure is known which includes a monolithic substrate that has a filtration cell and a water collecting cell, and a separation membrane that is formed on an inner surface of the filtration cell (reference is made to PCT Laid Open Application 2010/134514). The monolithic substrate includes a support body that is configured from a porous material. The separation membrane is a gas separation membrane used in relation to a method of penetrative vaporization or a method of vapor infiltration.

In this context, PCT Laid Open Application 2010/134514 discloses a method of adjusting the dimensions of a filtration cell and a water collecting cell for the purpose of increasing the water flux (water vapor transmission rate per membrane surface area) in the monolithic separation membrane structure.

Specification of Japanese Patent No. 3868479 discloses the feature that the $N_2$ gas permeability of a porous substrate is configured as 200 to 7000 $(m^3/m^2 \cdot h \cdot atm)$ for the purpose of increasing water flux in a penetrative vaporization membrane provided with a tubular porous substrate and a separation membrane formed on surface of the substrate.

SUMMARY OF THE INVENTION

Technical Problem

However, since the method disclosed in PCT Laid Open Application 2010/134514 requires the accurate formation of the filtration cell and the water collecting cell, there is a need for an increase in the water flux irrespective of the dimensions of the filtration cell and the water collecting cell.

Furthermore, even when the $N_2$ gas permeability is adjusted as disclosed in Specification of Japanese Patent No. 3868479, there is the problem that when the substrate has a monolithic configuration, it is difficult to enhance the water flux by use of penetrative vaporization separation that is performed on the permeation side at a reduced pressure.

The present invention is proposed in light of the situation described above, and has the purpose of providing a monolithic separation membrane structure, a method of producing the monolithic separation membrane structure, and a method of dehydrating that enable an increase in water flux.

Solution to Problem

The monolithic separation membrane structure according to the present invention includes a support body, a first seal portion, a second seal portion, and a separation membrane. The support body is configured by a porous material. A plurality of first through holes and a plurality of second through holes are formed in the support body. The separation membrane is formed in a tubular configuration on an inner side of the plurality of through holes, and is used in relation to a method of penetrative vaporization or a method of vapor infiltration. The first seal portion covers a first end surface of the support body. The second seal portion covers a second end surface of the support body. Both ends of the respective plurality of first through holes open into the first seal portion and the second seal portion. Both ends of the respective plurality of second through holes are closed by a closure member. The helium gas permeation resistance in the support body is less than $8.3 \times 10^7$ Pa·sec/$m^2$.

Effect of Invention

The present invention enables the provision of a monolithic separation membrane structure, a method of producing the monolithic separation membrane structure, and a method of dehydrating that enables an increase in water flux.

DESCRIPTION OF EMBODIMENTS

Figure 1:
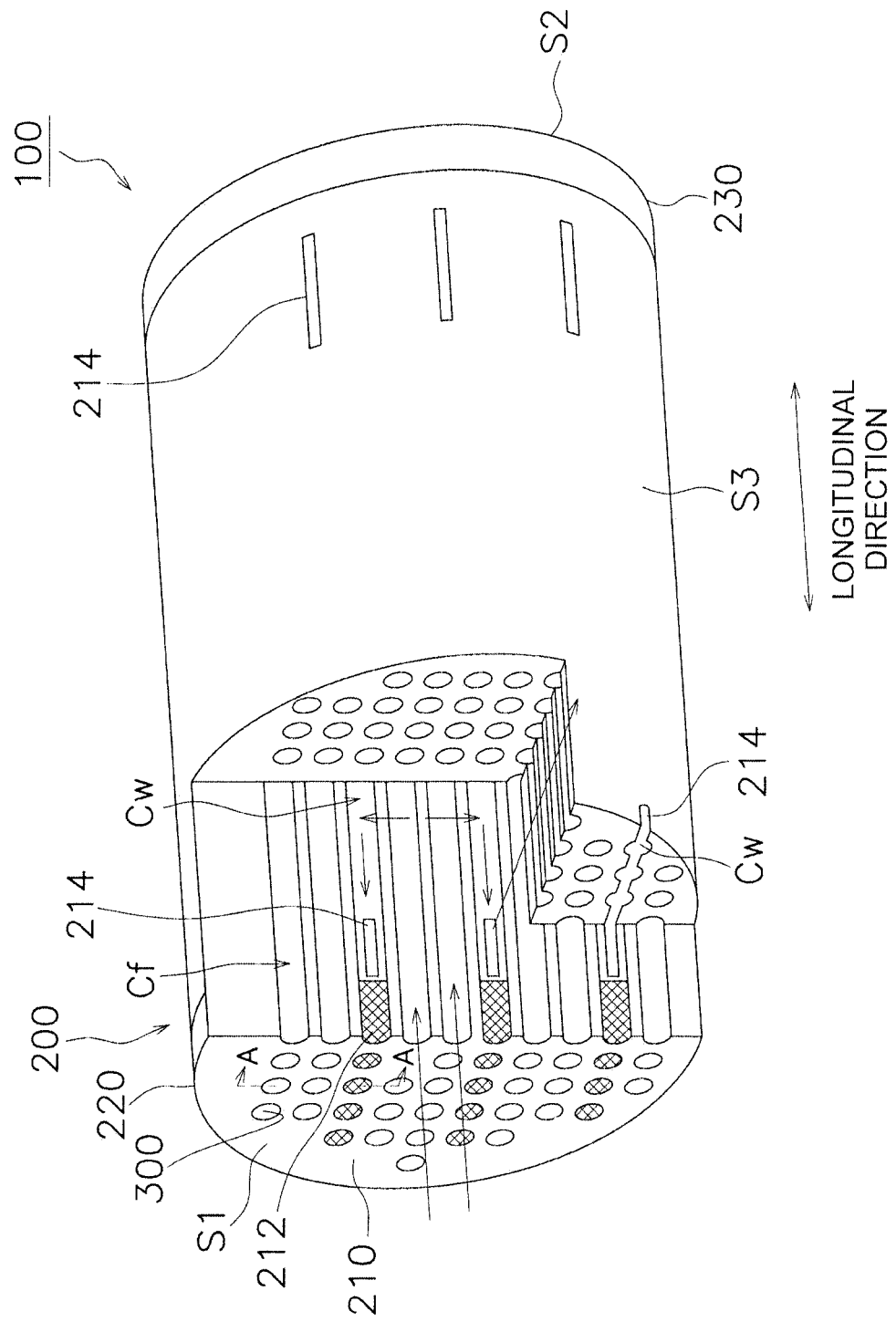
FIG. 1 is a perspective view illustrating a monolithic separation membrane structure.

Next, the embodiments of the present invention will be described making reference to the figures. In the description of the figures below, the same or similar portions are denoted by the same or similar reference numerals. However, the figures are merely illustrative and the ratio of respective dimensions or the like may differ from the actual dimensions. Therefore, the actual dimensions or the like should be determined by reference to the following description. Furthermore, it goes without saying that the ratios or the relations of dimensions used in respective figures may be different.

In the following embodiments, the term "monolithic" is a concept that denotes a shape that includes a plurality of through holes formed in a longitudinal direction, and includes a honeycomb shape.

Structure of Monolithic Separation Membrane Structure 100

Figure 2:
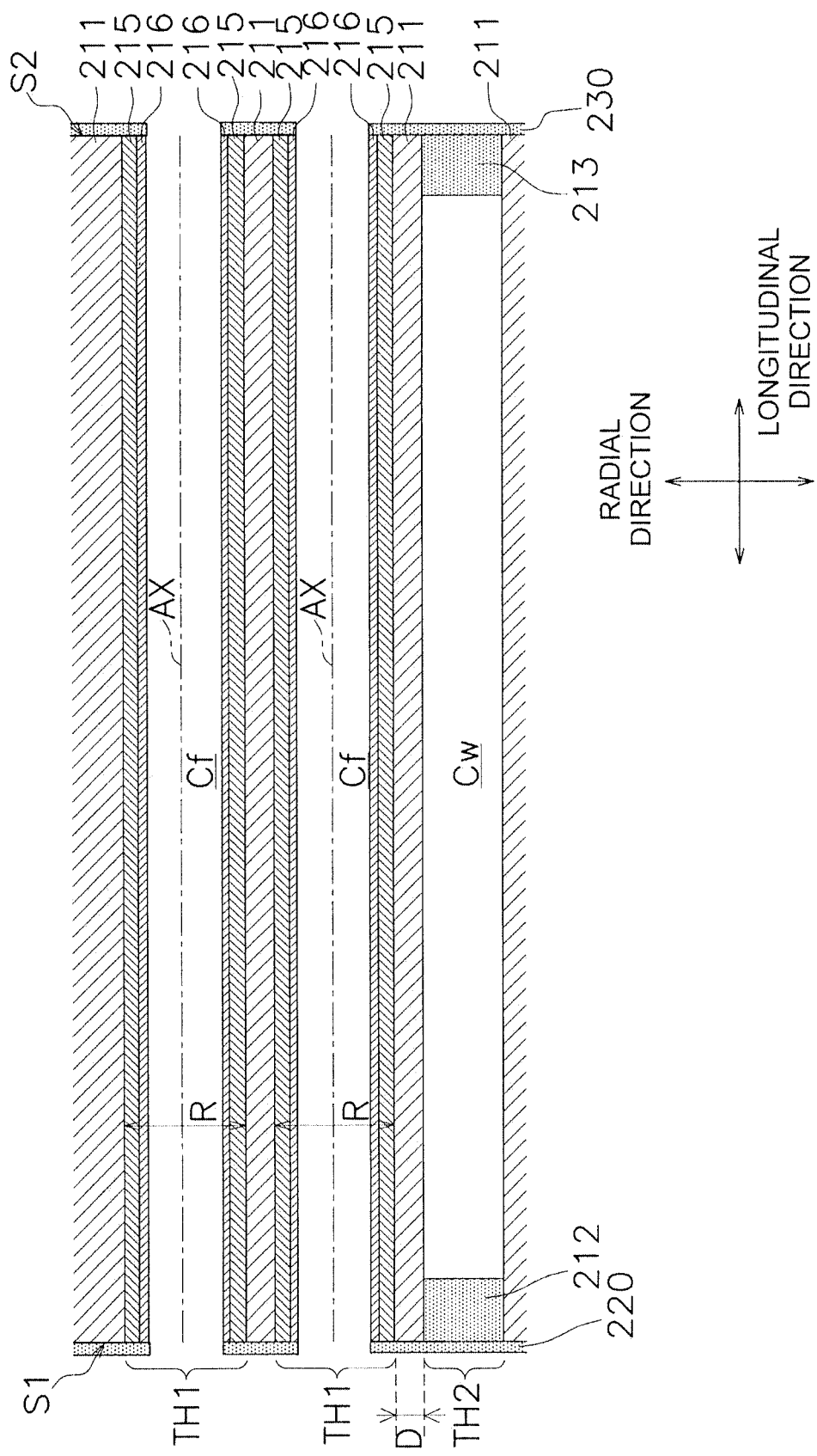
FIG. 2 illustrates a sectional view along the line A-A of FIG. 1.

FIG. 1 is a perspective view illustrating a monolithic separation membrane structure 100. FIG. 2 illustrates a sectional view along the line A-A of FIG. 1. FIG. 1 includes a partial illustration of an inner structure of the monolithic separation membrane structure 100. The arrow in FIG. 1 denotes the flow of water (water vapor) in the permeation separation component.

The monolithic separation membrane structure 100 includes a monolithic substrate 200 and a separation membrane 300.

The monolithic substrate 200 includes a base material body 210, a first seal portion 220 and a second seal portion 230.

The base material body 210 is porous. The base material body 210 is formed as a circular cylinder. The length of the base material body 210 in a longitudinal direction is 150 to 2000 mm, and the diameter of the base material body 210 in the short width direction is 30 to 220 mm. However there is no limitation in this regard.

The base material body 210 has a first end surface S1, a second end surface S2 and a side surface S3. The first end surface S1 is provided opposite to the second end surface S2.

The side surface S3 is connected to the first end surface S1 and the second end surface S2.

The base material body 210 includes a support body 211, a plurality of first closure portions 212, a plurality of second closure portions 213, a discharge passage 214, an intermediate layer 215, and a surface layer 216.

The support body 211 is formed as a circular cylinder. A plurality of first through holes TH1 and a plurality of second through holes TH2 are formed in an inner portion of the support body 211. The first through holes TH1 and second through holes TH2 respectively pass through the support body 211 from the first end surface S1 to the second end surface S2. However both ends of the first through holes open into the first seal portion 220 and the second seal portion 230. Both ends of the second through holes TH2 do not open into the first seal portion 220 and the second seal portion 230. Although the sectional shape of the first through holes TH1 and second through holes TH2 is circular, there is no limitation in this regard. The inner diameter of the first through holes TH1 and second through holes TH2 may be configured as 1 to 5 mm. As illustrated in FIG. 2, the inner radius R of the first through holes TH1 is preferably no more than 2.5 mm in a radial direction perpendicular to the central axis AX of the first through holes TH1. The shortest distance D in the first through holes TH1 and the second through holes TH2 in the radial direction is preferably no more than 0.65 mm. Although the inner radius of the second through holes TH2 may be set to an equivalent value to that of the first through holes TH1, there is no limitation in this regard.

The support body 211 is formed by a porous material. The porous material that configures the support body 211 includes use of a ceramic, metal, resin, or the like. In particular, use of a porous ceramic is preferred. The aggregate material used in relation to the porous ceramic material includes alumina ($Al_2O_3$), titania ($TiO_2$), mullite ($Al_2O_3 \cdot SiO_2$), potsherd, and cordierite ($Mg_2Al_4Si_5O_{18}$), and in particular, alumina is preferred in light of ease of availability, formation of a stable clay, and anticorrosive properties. The support body 211 may include an inorganic binder in addition to the porous material. The inorganic binder may include at least one of titania, mullite, sinterable alumina, silica, glass frits, clay minerals, and sinterable cordierite. The porosity of the support body 211 may be configured to 25% to 50%. The average pore diameter of the support body 211 may be 5 micrometers to 25 micrometers. The average pore diameter of the support body 211 can be measured using a mercury press-in method. The average particle diameter of the porous material that configures the support body 211 may be 1 micrometer to 100 micrometers. In the present embodiment, the term "average particle diameter" denotes the value of the arithmetic mean for the maximum diameter of 30 measured particles that are measured by cross sectional micro-structure observation by use of a scanning electron microscope (SEM).

The helium gas permeation resistance (referred to below as "He permeation resistance") in the support body 211 is preferably less than $8.3 \times 10^7$ Pa·sec/m$^2$, and more preferably less than or equal to $5.6 \times 10^7$ Pa·sec/m$^2$. The He permeation resistance in the support body 211 is a physical value related to the material that configures the support body 211, and therefore the He permeation resistance for the overall support body 211 will be the same as the He permeation resistance for a portion of the support body 211. Therefore, the He permeation resistance in the support body 211 does not require the measurement of the whole support body 211 and may be performed by measurement of a portion that is cut from the support body 211.

When confirming He permeation resistance during a step of producing the support body 211, a test piece having a desired shape (for example, planar, bar-shaped, or the like) is cut out of the support body 211 and used for a simple measurement. However, the He permeation resistance can be measured by use of a test piece having a desired shape (for example, a tubular shape, or the like) that is separately manufactured by use of the same material as the support body 211. The measurement of He permeation resistance can be performed with reference for example to JIS R 2115:1995 (test method for permeability of refractory bricks). According to this test method, there is almost no variation at all in the He permeation resistance as a result of the measurement device or measurement conditions. Furthermore, the size or shape of the test piece can be varied in an arbitrary manner without reference to the test specifications, and even when there is a variation of the size or the shape of the test piece, it is possible to measure an individual He permeation resistance for the support body 211.

The He permeation resistance in the support body 211 as described below can be simply adjusted by adding a coarse-grained aggregate material to the aggregate material used in the support body 211, or by adding a pore forming agent to the porous material of the support body 211. As used herein, "coarse-grained aggregate material" is a coarse particle having an average particle diameter of (5 micrometers to 500 micrometers) and at least 3 times the average particle diameter (1 micrometer to 100 micrometers) of the principal material used in the aggregate material. The average particle diameter of the aggregate material can be measured by use of a laser diffraction method.

The first closure portion 212 (example of a closure portion) closes the opening on the first end surface S1 of the second through holes TH2. The second closure portion 213 closes the opening on the second end surface S2 of the second through holes TH2. In this manner, both end portions of the second through holes TH2 are closed by the first and second closure portions 212, 213, and as a result, a water collecting cell Cw is formed between the first and second closure portions 212, 213. In the present embodiment, as illustrated in FIG. 1, a plurality of water collecting cells Cw is aligned in a predetermined direction.

The first and second closure portions 212, 213 can be configured by the same material as the support body 211. The porosity of the first and second closure portions 212, 213 is preferably 25 to 50%. The length of the first and second closure portions 212, 213 is about 10 to 20 mm.

As illustrated in FIG. 1, the discharge passage 214 connects a plurality of water collecting cells Cw that are aligned in a predetermined direction. Both ends of the discharge passage 214 open on the side surface S3. In the present embodiment, as illustrated in FIG. 1, two discharge passages 214 are provided for one water collecting cell Cw, and the number and position of the discharge passages 214 can be varied in a suitable manner.

The intermediate layer 215 is disposed on the inner surface of the first through hole TH1 of the support body 211. The intermediate layer 215 is formed in a tubular shape. The intermediate layer 215 can be configured by the same material as the support body 211. The intermediate layer 215 may contain the inorganic binder that is used in the support body 211. The inorganic binder and the porous material used in the intermediate layer 215 may be the same type or a different type to that used in the support body 211.

The thickness of the intermediate layer 215 in the radial direction may be configured as 30 micrometers to 200 micrometers. The porosity of the intermediate layer 215 may be configured as 20% to 60%. The average pore diameter of the intermediate layer 215 is smaller than the average pore diameter of the support body 211. The average pore diameter of the intermediate layer 215 may be configured as 0.005 micrometers to 5 micrometers. The average pore diameter of the intermediate layer 215 may be measured using an air flow method as prescribed by ASTM F316 (Standard Test Methods for Pore Size Characteristics of Membrane and Filters by Bubble Point and Mean Flow Pore Test). The average particle diameter of the porous material that configures the intermediate layer 215 is smaller than the average particle diameter of the porous material that configures the support body 211. The average particle diameter of the porous material that configures the intermediate layer 215 may be configured as 0.1 micrometers to 30 micrometers. The thickness of the intermediate layer 215 in a radial direction can be configured as 30 micrometers to 200 micrometers.

The intermediate layer 215 in the present embodiment is not provided in the second through holes TH2 (that is to say, the water collecting cell Cw).

The surface layer 216 is disposed on the inner surface of the intermediate layer 215. The surface layer 216 is formed in a tubular shape. The surface layer 216 in the present embodiment functions as a carrier (ground layer) for the separation membrane 300. The surface layer 216 can be configured by use of the same material as the support body 211. However, it is preferred that an aggregate material such as alumina or titania is included. The surface layer 216 may contain the inorganic binder used in the support body 211.

The thickness of the surface layer 216 in the radial direction may be configured as 1 micrometer to 50 micrometers. The porosity of the surface layer 216 may be configured as 20% to 60%. The average pore diameter of the surface layer 216 is smaller than the average pore diameter of the intermediate layer 215. The average pore diameter of the surface layer 216 may be configured as 0.001 micrometers to 5 micrometers. The average particle diameter of the porous material that configures the surface layer 216 is smaller than the average particle diameter of the porous material that configures the intermediate layer 215. The average particle diameter of the porous material that configures the surface layer 216 may be configured as 0.01 micrometers to 20 micrometers.

The surface layer 216 is in the present embodiment is not provided in the second through holes TH2 (that is to say, the water collecting cell Cw).

The first seal portion 220 covers the whole surface of the first end surface S1 and a portion of the side surface S3. The first seal portion 220 controls the infiltration, from the first end surface S2 to the base material body 210, of the mixed fluid that enters the first through holes TH1. The first seal portion 220 is formed so that a barrier is not formed in relation to the input port for the filtration cell Cf. The material that configures the first seal portion 220 includes use of glass, metal, rubber, resin, or the like. However, glass is preferred in light of adaptability with the thermal expansion coefficient of the base material body 210. It is sufficient if the first seal portion 220 covers the first end surface S1, and the side surface S3 does not have to be covered. When the first seal portion 220 covers a portion of the side surface S3, an interposed member (O-ring, gasket, or the like) mounted on a portion formed on the side surface S3 of the first seal portion 220 maintains water-tight characteristics and air-tight characteristics with the storage body that contains the base material body 210.

As illustrated in FIG. 2, the first seal portion 220 covers the first closure portion 212. In this manner, since the infiltration of the mixed fluid into the first closure portion 212 is controlled, it is possible to inhibit the mixed fluid from flowing into the water collecting cell Cw.

The second seal portion 230 covers the whole surface of the second end surface S2 and a portion of the side surface S3. The second seal portion 230 controls the infiltration, from the second end surface S2 to the base material body 210, of the mixed fluid that flows out of the first through holes TH1. The second seal portion 230 is formed so that a barrier is not formed in relation to the output port for the infiltration cell Cf. The second seal portion 230 may be composed of the same material as the first seal portion 220. It is sufficient if the second seal portion 230 covers the second end surface S2, and the side surface S3 does not have to be covered. When the second seal portion 230 covers a portion of the side surface S3, an interposed member mounted on a portion formed on the side surface S3 of the second seal portion 230 maintains water-tight characteristics and air-tight characteristics with the storage body that contains the base material body 210.

As illustrated in FIG. 2, the second seal portion 230 covers the second closure portion 213. In this manner, since the infiltration of the mixed fluid into the second closure portion 213 is controlled, it is possible to inhibit the mixed fluid from flowing into the water collecting cell Cw.

The separation membrane 300 is disposed on an inner side of the first through holes TH1. In the present embodiment, the separation membrane 300 is disposed on an inner surface of the surface layer 216. The separation membrane 300 is formed in a tubular shape. A filtration cell Cf is formed on the inner side of the separation membrane 300 to allow through flow of the mixed fluid.

The separation membrane 300 is a gas separation membrane or a vapor infiltration membrane used in relation to a method of vapor infiltration, or a penetrative vaporization membrane used in relation to a method of penetrative vaporization. This type of gas separation membrane includes a known carbon monoxide separation membrane (for example, reference is made to Japanese Patent No. 4006107), a helium separation membrane (for example, reference is made to Japanese Patent No. 3953833), a hydrogen separation membrane (for example, reference is made to Japanese Patent No. 3933907), a carbon membrane (for example, reference is made to Japanese Patent Laid-Open No. 2003-286018), a DDR type zeolite membrane (for example, reference is made to Japanese Patent Laid-Open No. 2004-66188), and a silica membrane (for example, reference is made to the pamphlet of PCT Laid Open Application 2008/050812). For example, when the separation membrane 300 is a penetrative vaporization membrane and the mixed fluid is an ethanol water solution, the water (water vapor) permeating the separation membrane 300 permeates the monolithic substrate 200, flows out of the side surface S3 or the discharge passage 214, and the ethanol permeating the separation membrane 300 flows out of the filtration cell Cf.

In the present embodiment, the separation membrane 300 is disposed on an inner surface of the second through holes TH2.

Method of Manufacturing Monolithic Separation Membrane Structure 100

Firstly, the porous material for the support body 211 described above is prepared. At that time, it is preferred to add at least one of a coarse-grained aggregate material and a pore forming agent to the aggregate material. In this manner, the helium gas permeation resistance in the support body 211 can be adjusted in a simple manner to less than $8.3 \times 10^7$ Pa·sec/m². When adding a coarse-grained aggregate material, for example, coarse-grained alumina having an average particle diameter of 50 to 300 micrometers is added at 5 wt % to 40 wt % to alumina having an average particle diameter of 1 to 100 micrometers. When adding a pore forming agent, 0.1 wt % to 20 wt % of the pore forming agent may be added to the aggregate material. The pore forming agent for example includes use of a combustible fine powder such as a water absorbent polymer, an organic compound, a high polymer, wooden material or the like. The use of the coarse-grained aggregate material and the pore forming agent may be combined.

Next, the prepared porous material is used to form a green body for the support body 211 that includes a plurality of first through holes TH1 and a plurality of second through holes TH2. The method of forming the green body includes use of an extrusion molding method using a vacuum extrusion molding device, in addition to a press molding method or a slip cast method.

Next, a sharp instrument is used to form a discharge passage 214, that is connected to the plurality of second through holes TH2 aligned in a predetermined direction, in the green body for the support body 211.

Next, a closure portion slurry is prepared by adding an organic binder, a sintering additive, a pH adjusting agent and a surface active agent, or the like to the porous material for the first and second closure portions 212, 213. Then, a film such as polyester or the like is affixed to both end surfaces of the green body for the support body 211, and a hole is drilled into the portion of the film corresponding to the second through holes TH2. Thereafter, a green body for the first and second closure portions 212, 213 is formed by pressing both end portions of the green body for the support body 211 into the closure portion slurry that has been placed into a vessel.

Next, the green body for the support body 211 and the first and second closure portions 212, 213 is fired (for example, 500 degrees C. to 1500 degrees C., 0.5 hours to 80 hours) to thereby form the support body 211 and the first and second closure portions 212, 213.

Next, an intermediate layer slurry is prepared by adding an organic binder, a sintering additive, a pH adjusting agent and a surface active agent, or the like to the porous material for the intermediate layer 215. A green body for the intermediate layer 215 is formed on the inner surface of the first through holes TH1 by a filtration method using the intermediate layer slurry. Thereafter, the green body for the intermediate layer 215 is fired (for example, 500 degrees C. to 1400 degrees C., 0.5 hours to 80 hours) to thereby form the intermediate layer 215.

Next, a surface layer slurry is prepared by adding a sintering additive, a pH adjusting agent and a surface active agent, or the like to the porous material for the surface layer 216. A green body for the surface layer 216 is formed on the inner surface of the intermediate layer 215 by a filtration method using the surface layer slurry. Thereafter, the green body for the surface layer 216 is fired (for example, 500 degrees C. to 1400 degrees C., 0.5 hours to 80 hours) to thereby form the surface layer 216.

The separation membrane 300 is formed on the inner surface of the surface layer 216. The method of forming the separation membrane 300 may employ a suitable method that corresponds to the type of separation membrane 300.

Operation and Effect

Typically, since there is a reduction in pressure on the permeation side (i.e. the outer side of the side surface S3) of a monolithic separation membrane structure provided with a gas separation membrane such as a penetrative vaporization membrane or a vapor infiltration membrane, there is the problem of an extremely large pressure loss as a result of expansion of water vapor.

As a result of diligent investigation by the present inventors, the insight has been gained that a large effect can be imparted on the water flux (the water vapor permeation rate per membrane surface area) by a gas permeation resistance particularly in the support body of the monolithic substrate.

In the present embodiment, the He permeation resistance in the support body 211 is less than $8.3 \times 10^7$ Pa·sec/m². In this manner, it is possible to enhance the water flux of the monolithic separation membrane structure 100.

The He permeation resistance in the support body 211 can be simply adjusted by addition of a coarse-grained aggregate material to the aggregate material of the support body 211 or by addition of a pore forming agent to the porous material of the support body 211.

Other Embodiments

Although an embodiment of the present invention has been described, the present invention is not limited to the above embodiment, and various modifications are possible within a scope that does not depart from the spirit of the invention.

(A) In the above embodiment, the base material body 210 includes a support body 211, an intermediate layer 215, and a surface layer 216. However, at least one of the intermediate layer 215 and the surface layer 216 may be omitted. In the event that both of the intermediate layer 215 and the surface layer 216 are omitted from the base material body 210, the separation membrane 300 is disposed on the inner surface of the first through holes TH1 of the support body 211. When the base material body 211 does not include the surface layer 216, the separation membrane 300 is disposed on the inner surface of the intermediate layer 215. The intermediate layer 215 or the surface layer 216 may be respectively a single layer or may be configured from a plurality of layers.

(B) In the above embodiment, the support body 211 includes a water collecting cell Cw and a discharge passage 214. However, the water collecting cell Cw and the discharge passage 214 may be omitted.

(C) In the above embodiment, the sectional shape of the discharge passage 214 is rectangular. However a configuration as a circle, oval or four-sided figure is also possible.

EXAMPLES

The examples of the present invention will be described below. However, the present invention is not thereby limited to the following examples.

Preparation of Samples No. 1 to No. 6

A monolithic separation membrane structure according to Samples No. 1 to No. 6 is prepared as described below.

Firstly, 20 parts by mass of an inorganic binder was added to 100 parts by mass of alumina having an average particle diameter of 30 micrometers, then water, a dispersing agent and a thickener were added, and the mixture was kneaded to prepare a porous material. In Sample No. 3 to No. 5, 20 parts by mass of coarse grained alumina having an average particle diameter of 100 micrometers was added. In Sample No. 6, 2 parts by mass of a water absorbing polymer was added as a pore forming agent.

Next, a green body for the support body that includes a plurality of first through holes and a plurality of second through holes was prepared by extrusion molding of the prepared porous material. In relation to Sample No. 5, the minimum distance between through holes or the inner diameter of each through hole was varied by substitution of the mouth piece of the extrusion molding device.

Next, a sharp instrument was used to form a discharge passage that is connected to the second through holes.

Next, a closure portion slurry was prepared by adding an organic binder, a sintering additive, a pH adjusting agent and a surface active agent, or the like to the porous material for the closure portions. Then, a film such as polyester or the like was affixed to both end surfaces of the green body of the support body, and a hole was made into the portion of the film corresponding to the second through holes. Thereafter, a green body for the closure portions was formed on both ends of the second through holes TH2 by pressing both end portions of the green body of the support body into the closure portion slurry that has been placed into a vessel. In this manner, the water collecting cell was formed.

Next, the green body for the support body was fired (1250 degrees C., 1 hour) to prepare the support body. Each sample was prepared in two types of φ30 mm and φ180 mm. The minimum distance in the first through hole and the second through hole and the He permeation resistance in the support body of each sample are shown in Table 1. The He permeation resistance is a value measured by use of a tubular test piece prepared by extrusion molding of the prepared porous material.

Next, an intermediate layer slurry was formed by addition of glass, water and a binder to alumina, and a green body for the intermediate layer was formed on an inner surface of the first through holes by a filtration method by use of the intermediate layer slurry. Next, the green body for the intermediate layer was fired (950 degrees C., 3 hours) to prepare the intermediate layer. The thickness of the intermediate layer and the He permeation resistance of each sample are shown in Table 1. The He permeation resistance in the intermediate layer was calculated as shown below. Firstly, after a tubular support body was formed, helium was supplied into an inner portion of the support body, and the helium pressure loss to a helium flow amount was measured at three points. Those measurement values were used to calculate a pressure loss per unit flow rate. Next, the intermediate layer was formed on an inner surface of the support body to thereby prepare a tubular support body having an intermediate layer attached thereto. Next, helium was supplied into an inner portion of the support body having an intermediate layer attached, and the helium pressure loss to a helium flow amount was measured at three points. Those measurement values were used to calculate a pressure loss per unit flow rate. The pressure loss per unit flow rate in the intermediate layer was calculated by subtracting the pressure loss per unit flow rate in the support body from the pressure loss per unit flow rate in the support body having an intermediate layer attached. The pressure loss per unit flow rate in the intermediate layer was divided by the thickness of the intermediate layer to thereby calculate the He permeation resistance ($Pas/m^2$) in the intermediate layer.

Next, a surface layer slurry was formed by addition of water and a binder to titania, and a green body for the surface layer was formed on an inner surface of the intermediate layer by a filtration method by use of the surface layer slurry. Next, the green body for the surface layer was fired (950 degrees C., 3 hours) to prepare the surface layer. The thickness of the surface layer and the He permeation resistance of each sample are shown in Table 1. The He permeation resistance in the surface layer was calculated as shown below. Firstly, the surface layer was formed on an inner surface of the support body having the intermediate layer attached to thereby prepare a tubular support body with a surface layer attached. Next, helium was supplied into an inner portion of the support body with a surface layer attached, and the helium pressure loss to a helium flow amount was measured at three points. Those measurement values were used to calculate a pressure loss per unit flow rate. The pressure loss per unit flow rate in the surface layer was calculated by subtracting the pressure loss per unit flow rate in the intermediate layer and the pressure loss per unit flow rate in the support body from the pressure loss per unit flow rate in the support body having a surface layer attached. The pressure loss per unit flow rate in the surface layer was divided by the thickness of the surface layer to thereby calculate the He permeation resistance ($Pas/m^2$) in the surface layer.

Next, the water permeation amount (water flow rate per unit surface area) and the $N_2$ gas permeation amount ($N_2$ permeation flow rate per unit surface area) of the base material body prepared as described above were measured. When measuring the $N_2$ gas permeation amount, the permeation side was configured at atmospheric pressure to suppress expansion of $N_2$ gas. The measurement results are shown in Table 1.

The method disclosed in PCT Laid Open Application 2010/134514 was used to form a carbon membrane on an inner surface of the surface layer. In this manner, a filtration cell was formed. The diameter of the filtration cell, that is to say, the inner diameter of the carbon membrane is shown in Table 1.

Measurement of Water Flux

The monolithic separation membrane structure of each sample was incorporated into a separation device, and penetrative vaporization with a pressure reduction on the permeation side was performed to thereby measure water flux. More specifically, the monolithic separation membrane structure was pressed into a storage body, the pressure on the water collecting cell side was reduced to 10 Torr by use of a vacuum pump, and an ethanol aqueous solution (concentration 50 mass %, and 50 degrees C.) was repetitively caused to flow into the filtration cell. Water vapor after permeation was cooled and collected by a cold trap device and the mass and concentration thereof were used to thereby calculate water flux (water permeation rate per membrane surface area). The calculation results are shown in Table 1.

TABLE 1

| | Support Body | | | | Intermediate Layer | | |
|---|---|---|---|---|---|---|---|
| Sample No. | Minimum Distance between First Through Holes and Second Through Holes (mm) | Inner Diameter of First Through Holes (mm) | He Permeation Resistance ($Pa \cdot s/m^2$) | Additive for Adjusting He Permeation Resistance | Aggregate Material | He Permeation Resistance ($Pa \cdot s/m^2$) | Thickness μm |
| 1 | 0.65 | 2.5 | $8.3 * 10^7$ | — | Alumina/Glass | $2.5 * 10^9$ | 150 |
| 2 | 0.65 | 2.5 | $8.3 * 10^7$ | — | Alumina/Glass | $2.5 * 10^9$ | 110 |
| 3 | 0.65 | 2.5 | $5.6 * 10^7$ | Coarse-Grained Aggregate | Alumina/Glass | $2.5 * 10^9$ | 150 |

TABLE 1-continued

| 4 | 0.65 | 2.5 | $5.6 * 10^7$ | Coarse-Grained Aggregate | Alumina/Glass | $2.5 * 10^9$ | 110 |
| 5 | 0.51 | 1.8 | $5.6 * 10^7$ | Coarse-Grained Aggregate | Alumina/Glass | $2.5 * 10^9$ | 150 |
| 6 | 0.65 | 2.5 | $2.0 * 10^7$ | Pore Forming Agent | Alumina/Glass | $2.5 * 10^9$ | 150 |

| | Surface Layer | | Base Material Body | | | | |
|---|---|---|---|---|---|---|---|
| | | | | | Separation Membrane | φ 180 mm | |
| | | He | | Water | | | |
| Sample No. | Aggregate Material | Permeation Resistance (Pa · s/m2) | Thickness µm | Permeation Amount (m/day · atm) | $N_2$ Permeation Amount ($m^3/m^2 h \cdot atm$) | Aggregate Material | Inner Diameter (mm) | φ 30 mm Water Flux ($kg/m^2 h$) | Water Flux (kg/m2h) |
| 1 | Titania | $7.8 * 10^9$ | 20 | 45 | 115 | Carbon Membrane | 2.5 | 1.5 | 2.4 |
| 2 | Titania | $7.8 * 10^9$ | 10 | 60 | 155 | Carbon Membrane | 2.5 | 1.5 | 2.4 |
| 3 | Titania | $7.8 * 10^9$ | 20 | 45 | 115 | Carbon Membrane | 2.5 | 1.8 | 2.8 |
| 4 | Titania | $7.8 * 10^9$ | 10 | 60 | 155 | Carbon Membrane | 2.5 | 1.8 | 2.8 |
| 5 | Titania | $7.8 * 10^9$ | 20 | 25 | 65 | Carbon Membrane | 1.8 | 2.6 | 3.5 |
| 6 | Titania | $7.8 * 10^9$ | 20 | 70 | 180 | Carbon Membrane | 2.5 | 2.5 | — |

As illustrated in Table 1, the thickness of the surface layer and the intermediate layer in the base material body has a large effect on the permeation amount of water (water permeation amount) or the $N_2$ permeation amount. This feature is due to the fact that the He permeation resistance in the surface layer and the intermediate layer is greater than the He permeation resistance in the support body. However, the thickness of the surface layer and the intermediate layer has almost no effect on the water flux values that are measured by penetrative vaporization separation when the pressure on the permeation side is reduced. That is to say, even when the thickness of the surface layer and the intermediate layer is low, there are difficulties associated with enhancing the water flux during penetrative vaporization separation and vapor infiltration separation.

On the other hand, as shown by the comparison of Sample No. 1 and 2 and Sample No. 3 and 4, the He permeation resistance of the support body that has little effect on the permeation amount or the $N_2$ permeation amount has a large effect on water flux. This is due to the fact that the support body position is at a position of lower absolute pressure than the intermediate layer and surface layer in a penetrative vaporization membrane and vapor infiltration membrane in which there is a reduction in the pressure on the permeation side. The gas at that position undergoes a large volume expansion, and therefore there is a large effect on the pressure loss of the support body portion. Furthermore, the pressure loss in the support body causes an increase in the absolute pressure of the intermediate layer and the surface layer position, and consequently, gas expansion is low, and the pressure loss is relatively small in the intermediate layer and the surface layer position. This fact is a new insight that is not known in the prior art.

More specifically, it can be seen that the He permeation resistance in the support body is preferably less than $8.3 \times 10^7$ Pa·sec/$m^2$, and more preferably less than or equal to $5.6 \times 10^7$ Pa·sec/$m^2$.

The He permeation resistance can be reduced by increasing the pore diameter or porosity of the support body as a result of addition of a pore forming agent or a coarse-grained aggregate material. Furthermore, the He permeation resistance can be reduced by decreasing the interval between the water collecting cell and the filtration cell. More specifically, the interval between the first through holes and the second through holes in the support body can be reduced or the inner diameter of the first through holes and the second through holes can be reduced.

Since it is possible to enhance the surface area of the separation membrane per unit volume by reducing the interval between the first through holes and the second through holes or by reducing the inner diameter of the first through holes and the second through holes, it is possible to enhance the water permeation flow rate of the separation membrane (kg/h·unit).

The invention claimed is:

1. A method of producing a monolithic separation membrane structure comprising:
    preparing a material including an aggregate material selected from the group consisting of alumina, titania, mullite, potsherd and cordierite;
    forming a porous support body including a plurality of first through holes and a plurality of second through holes from the material;
    closing both end openings of the respective plurality of second through holes; and
    forming a separation membrane selected from the group consisting of penetrative vaporization membranes and vapor infiltration membranes in a tubular shape on an inner side of the plurality of first through holes, wherein the helium gas permeation resistance in the support body is adjusted to $5.6 \times 10^7$ Pa·sec/$m^2$ or less by adding at least one of a coarse-grained aggregate material and a pore forming agent in the step for preparing the material, and
    wherein the amount of coarse-grained aggregate material added is 5 to 40 wt % and the amount of pore forming agent added is 0.1 to 20 wt %, based on the amount of aggregate material included in the step of preparing the material.

* * * * *